United States Patent
Lumpkin

[11] Patent Number: 5,515,743
[45] Date of Patent: *May 14, 1996

[54] ADJUSTABLE LEVERAGE BRAKE LEVER

[75] Inventor: Wayne R. Lumpkin, Littleton, Colo.

[73] Assignee: Avid Enterprises, Inc., Englewood, Colo.

[*] Notice: The term of this patent shall not extend beyond the expiration date of Pat. No. 5,448,927.

[21] Appl. No.: 439,420

[22] Filed: May 11, 1995

Related U.S. Application Data

[63] Continuation of Ser. No. 237,600, May 3, 1994, Pat. No. 5,448,927.

[51] Int. Cl.⁶ .............................. F16C 1/10; G05G 11/00
[52] U.S. Cl. .................................. 74/502.2; 74/489
[58] Field of Search ........................... 74/489, 502.2, 74/540, 500.5, 523, 524

[56] References Cited

U.S. PATENT DOCUMENTS

| | | | |
|---|---|---|---|
| 2,854,857 | 10/1958 | Gleasman et al. | 74/489 |
| 3,645,151 | 2/1972 | Yoshikawa | 74/489 |
| 3,733,922 | 5/1973 | Tripp | 74/489 |
| 4,005,613 | 2/1977 | Kaufman et al. | 74/489 |
| 4,084,449 | 4/1978 | Kine | 74/489 X |
| 4,273,174 | 7/1981 | Ross | 74/489 |
| 4,304,146 | 12/1981 | Ueda | 74/489 |
| 4,611,500 | 9/1986 | Nagano | 74/489 |
| 4,779,482 | 10/1988 | Kawaguchi | 74/523 |
| 4,819,497 | 4/1989 | Romano | 74/489 |
| 4,903,799 | 2/1930 | Romano | 74/489 |
| 5,078,023 | 1/1992 | Scarborough | 74/489 |
| 5,279,179 | 1/1994 | Yoshigai | 74/489 |
| 5,287,765 | 2/1994 | Scura | 74/489 X |
| 5,355,745 | 10/1994 | Wu et al. | 74/502.2 |
| 5,385,070 | 1/1995 | Tseng | 74/502.2 |

FOREIGN PATENT DOCUMENTS

| | | | |
|---|---|---|---|
| 0389931 | 10/1990 | European Pat. Off. | 74/502.2 |
| 435248 | 7/1991 | European Pat. Off. | 74/502.2 |
| 1210326 | 3/1960 | France | 74/502.2 |
| 458361 | 11/1947 | Italy | 74/489 |

Primary Examiner—Vinh T. Luong
Attorney, Agent, or Firm—Swanson & Bratschun

[57] ABSTRACT

A bicycle brake lever (10) adjustable to very the leverage applied to a bicycle brake connected to a lever (10). The lever (10) includes a brake handle (14) having an elongated finger grip (50) and a transverse elongated mounting arm (52) joined at their proximal ends and integrally formed. The mounting arm (52) is attached to a handle mount (12) for pivotal movement about a fixed axis. A cable link (16) is attached to the mounting arm of the brake handle by a slidable attachment (44, 64) for slidable movement along the length of the mounting arm (52) toward and away from a fixed axis. The cable link (16) includes an attachment for attaching a brake cable (78) thereto. A user may fix the cable link (16) at a select position along the length of the mounting arm (52) against slidable movement.

2 Claims, 1 Drawing Sheet

ADJUSTABLE LEVERAGE BRAKE LEVER

This is a continuation of application Ser. No. 08/237,600, filed on May 3, 1995, now U.S. Pat. No. 5,448,927, issued on Sep. 12, 1995.

BACKGROUND OF THE INVENTION

1. Technical Field

The present invention is directed toward brakes for bicycles, and more particularly toward a bicycle brake lever that is adjustable to vary the leverage applied to a bicycle brake connected to the lever by a brake cable.

2. Background Art

Bicycle brakes can broadly be classified as handle bar brakes and pedal brakes, depending upon the location where a rider actuates the brakes. As the names suggest, handle bar brakes are actuated at the bicycle handle bar by a rider squeezing a gripping bar of a brake lever assembly against the handle bar with his hands, and pedal brakes are actuated at the bicycle pedals. The present invention is an improvement to handle bar brakes.

Numerous types of bicycle brake mechanisms are known in the art, including drum brakes, cantilever brakes, disk brakes and calliper brakes. One common feature of these brake mechanisms is that the braking force is a function of the force applied to a brake cable extending between the brake mechanism and a brake lever assembly.

Typically a brake lever assembly consists of a brake handle including a finger grip bar and a transverse mounting arm. The mounting arm is attached to the bicycle handle bars by a mounting bracket for pivotal movement relative to the mounting bracket about a fixed axis. The brake cable is attached to the mounting arm a select distance from the fixed axis. As the finger grip bar is squeezed by a rider, the mounting arm pivots, increasing the tension on the brake cable, thereby actuating the brake mechanism. Once the brake mechanism is adjusted, the braking force is a function of how hard the finger grip bar is squeezed. How hard the finger grip must be squeezed and how far it must travel to provide a given braking force is known as the "feel" of the brakes.

Bicyclists, particularly avid bicyclists, each have a preferred feel for their bicycle brakes. Riders tend to anticipate the braking force that will result based upon the feel of their brakes. This feel is particularly important in high performance bicycling, such as off the road mountain biking, where applying too much braking force under certain conditions can cause the wheels to lock, resulting in a potentially dangerous loss of rider control or too little braking force can have disastrous consequences. Thus, not only is a particular feel a matter of user preference, in performance situations a consistent feel contributes to rider safety. To complicate matters, as brake pads wear, the feel of brakes can vary during a ride, particularly during off the road biking where dirt and grit increase brake pad wear and where brakes must be used often and aggressively.

With a conventional brake lever assembly, in order for a bicyclist to obtain desired feel for the handle bar brakes, the brake mechanism itself must be adjusted. This is a time consuming and difficult process requiring special tools. Adjustments are particularly difficult under field conditions where a bicyclist either does not have the necessary tools or does not want to take the time to adjust the brake mechanism.

An alternative to adjustment to the brake mechanism to alter the brake feel known in the art is providing a structure in the brake lever assembly for varying the distance between the fixed axis and the point of attachment of the brake cable to the mounting arm. This distance is known as the pivot arm. The known prior art device provides a plurality of holes along the length of the mounting arm at various distances from the fixed axis. While this structure does provide for coarse adjustment of the brake feel, the adjustment is only between pre-selected distances between the fixed axis and the point of attachment of the brake cable. Thus, only a limited number of pivot arm distances and therefore brake feels, are available. In addition, while this structure does not require disassembly of the brake mechanism to adjust the brake feel, it does require disassembly of the brake lever assembly to reposition the point of attachment of the brake cable to the mounting arm. Thus, adjustment of the brake feel with this structure is still time consuming and requires tools which might not be available under field conditions.

The present invention is directed toward overcoming one or more of the problems discussed above.

SUMMARY OF THE INVENTION

A bicycle brake lever adjustable to vary the leverage applied to a bicycle brake connected to the brake lever. The brake lever includes a brake handle having an elongate finger grip and a transverse elongate mounting arm joined at their proximal ends and integrally formed. The mounting arm is attached to a handle mount for pivotal movement about a fixed axis. A cable link is attached to the mounting arm of the brake handle by a slidable attachment and is slidable along the length of the mounting arm toward and away from a fixed axis. The cable link includes a structure for attachment to a brake cable. As the cable link moves toward and away from the fixed axis, a pivot arm of the brake lever varies, thus varying the feel of the brakes. A user may fix the cable link against slidable movement at a select position along the length of the mounting arm.

The slidable attachment between the cable link and the mounting arm consists of an elongate slot formed lengthwise of the mounting arm and a threaded bolt mounted lengthwise within the elongate slot for axial rotation relative to the mounting arm. A barrel having opposing ends and an internally threaded transverse bore between the opposing ends is attached to the threaded bolt with the internally threaded bore threadably engaging the threaded bolt. Holes in parallel spaced brackets attached to the cable link receive the opposing ends of the barrel. A knurled head of the bolt allows for rotation of the threaded bolt without separate tools, thereby allowing the cable link to be moved relative to the mounting arm for Varying the distance of the pivot arm between the cable link and the fixed axis.

The adjustable leverage brake lever of the present invention provides bicycle riders with an easy and convenient device for adjusting the feel of the brakes of a bicycle in the field without the need of special tools or disassembly of the brake mechanism. Because the adjustable leverage brake lever provides for easy and expedient adjustment, riders will be inclined to adjust the leverage as desired. As a result, bike rider safety is improved because the riders can constantly adjust the brake feel to a feel with which they are accustomed. Moreover, the adjustable leverage brake lever requires only a few parts not present in conventional non-adjustable brake levers, making the adjustable leverage brake lever inexpensive to manufacture, easy to assemble and easy to maintain. In addition, the adjustable leverage brake lever provides for very fine adjustment of the brake feel.

DETAILED DESCRIPTION OF THE PREFERRED EMBODIMENT

Figure 1:
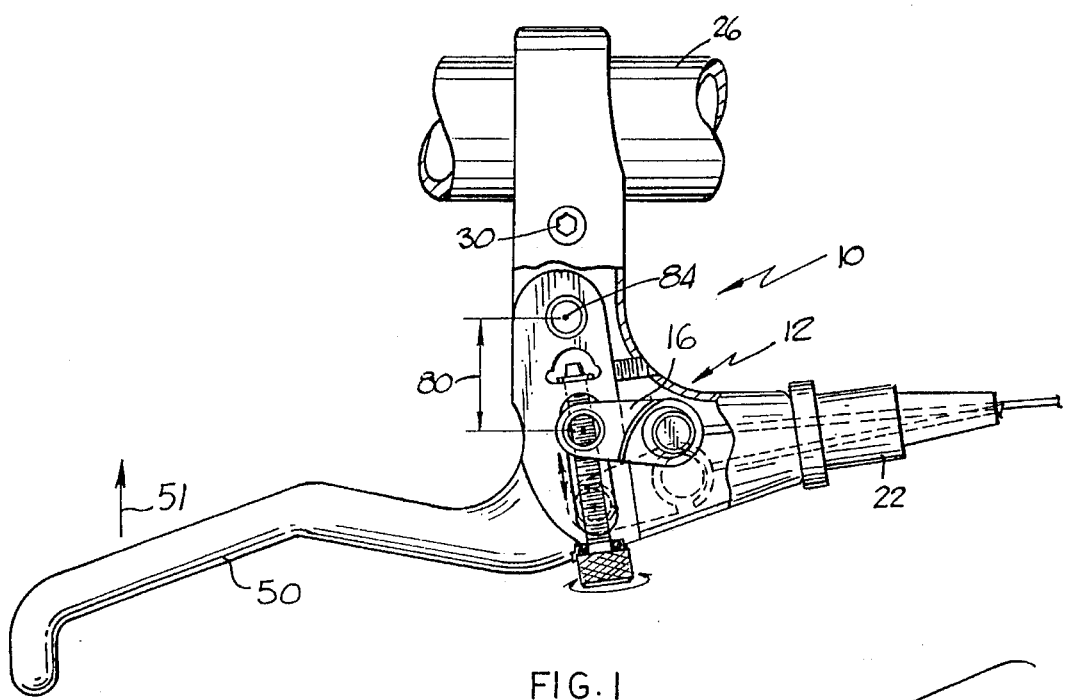
FIG. 1 is a side elevation view of the adjustable leverage brake lever with a portion of the handle mount housing broken away.
Figure 2:
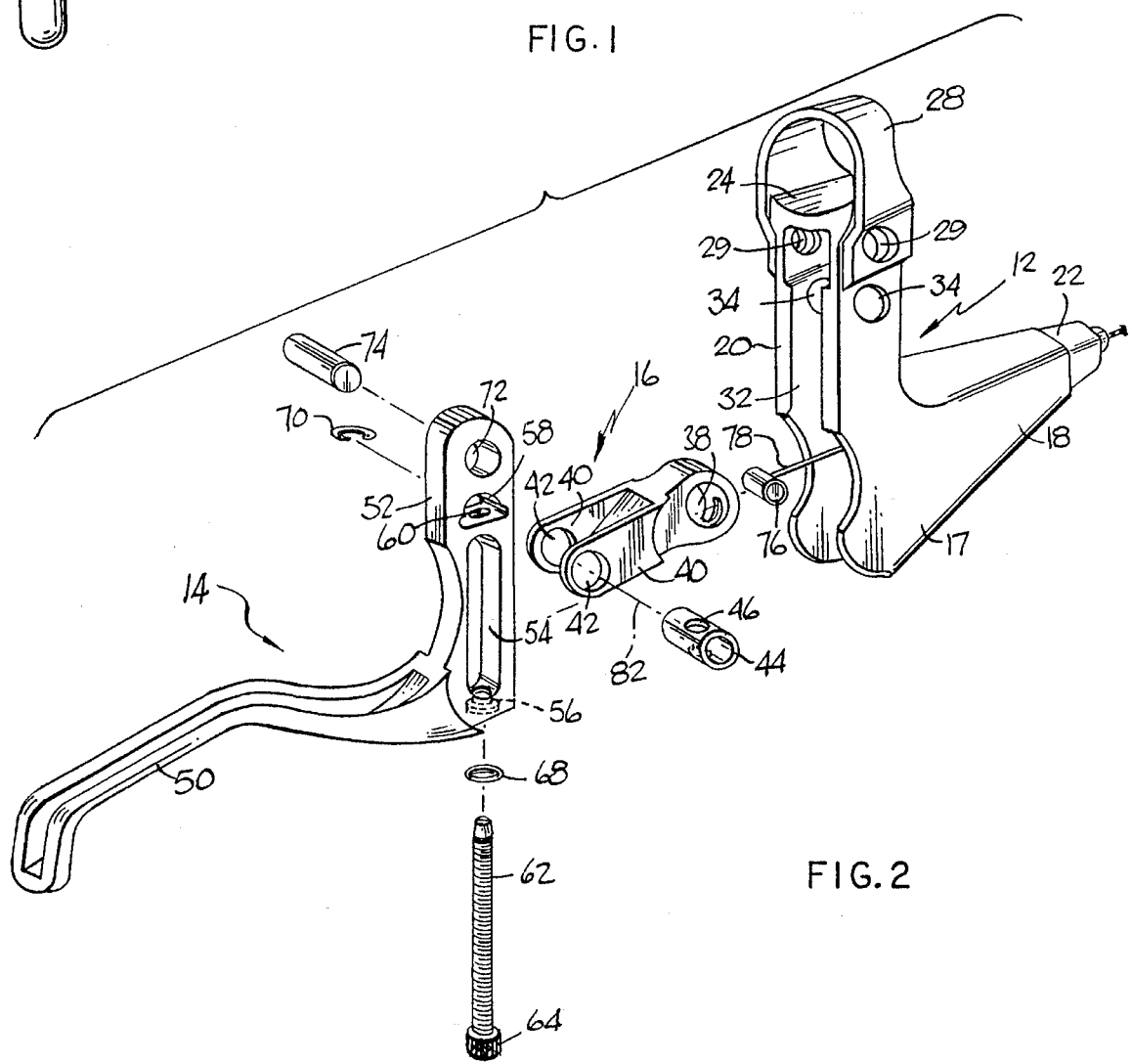
FIG. 2 is an exploded view of the adjustable leverage brake lever.

An adjustable leverage brake lever assembly 10 includes a handle mount 12, a brake handle 14 and a cable link 16. The handle mount 12 consists of hollow L-shaped lever housing 17 having an integrally formed nose cone 18 and post 20. At the distal end of the nose cone 18 is a brake cable tension adjuster 22. At the distal end of the post 20 is an annular surface 24 configured to conform to a bicycle handle bar 26. A strap 28 is configured to be fastened to the post 20 for attaching handle mount 12 to a handle bar. Beneath the annular surface 24 are attachment holes 29 which receive a bolt 30 to attach the handle mount 12 to a handle bar 26 as illustrated in FIG. 1. An opening 23 lengthwise along the post 20 allows for access of the hollow interior of the housing 17. Proximate the distal end of the post 20 are a pair of coaxial holes 34 which extend through the walls of the housing 17.

The cable link 16 has a brake cable barrel receptacle 38 at one end and a pair of spaced parallel brackets 40 extending from an opposite end. At the distal end of each of the spaced parallel brackets 40 are coaxial holes 42 sized to receive a cylinder or barrel 44 having a transverse internally threaded bore 46.

The brake handle 14 includes a finger grip bar 50 configured to be comfortably embraced by the fingers of a rider and an integrally connected mounting arm 52, the finger grip bar 50 and the mounting arm 52 being connected at their proximal ends. A lengthwise slot 54 is formed in the mounting arm 52. A counter sunk bore 56 extends between a proximal end of the lengthwise slot 54 and the proximal end of the mounting arm 52. An anchoring aperture 58 is formed in the mounting arm 52 slightly above a distal end of the lengthwise slot 54. A bore 60 extends between the anchoring aperture 58 and the distal end of the lengthwise slot 54. The bore 60 and the counter sunk bore 56 are coaxial so as to receive a jack bolt 62. The jack bolt 62 has a knurled head 64 at one end and a annular slot 66 at the other end. A neoprene O-ring 68 fits in the counter sunk bore 56 between the proximal end of the mounting arm 52 and the knurled head 64 of the bolt 62. With the jack bolt 62 inserted into the counter sunk bore 56 and the bore 60 as illustrated in FIG. 1, the jack bolt is held in place by an E-ring 70 received in the annular slot 66 of the jack bolt 62.

The adjustable leverage brake lever 10 is shown assembled in FIG. 1. The adjustable leverage brake lever 10 is assembled as follows. First, the neoprene O-ring 68 is slid onto the jack bolt 62. The jack bolt 62 is then partially inserted through the counter sunk bore 56. The spaced parallel brackets 40 are then aligned on opposite sides of the slot 54. Next the cylinder 44 is inserted through the coaxial holes 42 and the slot 54. Then the jack bolt 62 is brought into threaded engagement with the transverse internally threaded bore 46 of the cylinder 44 and threaded therethrough. When sufficient clearance is available, the jack bolt 62 is fully inserted into the counter sunk bore 56 with the distal end of the jack bolt 62 extending through the bore 60 into the anchoring aperture 58. The E-ring 70 is then slid into the annular slot 66 to hold the jack bolt 62 in place. In this manner the jack bolt 62 is mounted lengthwise in the slot 54 and may be axially rotated within the slot 54. Next, a pivot hole 72 at the distal end of the mounting arm 52 is aligned between the coaxial holes 34 of the handle mount 12 and secured in place by the pivot pin 74 to provide for pivoting attachment between the brake handle 10 and the handle mount 12. A cast lug barrel 76 of the brake cable 78 is then received within the cable barrel receptacle 38 in a manner known in the art for fixedly attaching the cable 78 to the cable link 16.

With the brake lever assembly 10 assembled as discussed above, the adjustable leverage feature functions as follows. The force required to pull the finger grip bar 50 and the distance traveled by the finger grip bar 50 as illustrated by arrow 51 of FIG. 1 which collectively define the "feel" of the brake are a function of the distance of the pivot arm 80 between the axis 82 the cylinder 44 of the cable link 16 and the fixed axis 84 of rotation between the brake handle 14 and the handle mount 12. Rotating the knurled head 64 of the jack bolt 62 in a first direction causes the cylinder 44 of the cable link 16 to move closer to the fixed axis 84 and rotation of the knurled head in a second opposite direction causes the cylinder 44 of the cable link 16 move away from the fixed axis 84. Once rotation of the knurled head 64 stops, the cable link 16 maintains its position along the jack bolt 62. In this manner, a rider can adjust the feel of the brake lever by turning the knurled head in either of the first and second directions. The neoprene O-ring 68 helps prevent vibrations during riding from causing unwanted rotation of the jack bolt 62. In the preferred embodiment, the pivot arm 80 is adjustable between a length of about 18–30 mm. With the pivot arm closer to 18 mm the rider obtains the greatest mechanical advantage, giving the brakes a "soft" feel. This position is illustrated in solid lines in FIG. 1. With the pivot arm at 30 mm, the rider has the least mechanical advantage, giving the brakes a "hard" feel. This position is illustrated in phantom lines in FIG. 1.

The adjustable leverage brake lever of the present invention allows a rider to adjust the brake pivot arm anywhere between 18–30 mm to allow for fine tuning of the brake feel. This adjustment can be made in the field without special tools or the need to disassemble the brake lever assembly or brake mechanism simply by turning the knurled head of the jack bolt. Thus, riders can quickly and easily provide a desired feel for the brakes of the bicycles. These advantages are achieved by a structure requiring a minimal number of parts, thereby minimizing material costs and the costs of assembly, resulting in the adjustable leverage brake lever being affordable to all bicyclists.

What is claimed is:

1. A brake lever adjustable to vary leverage applied to a brake connected to the lever by a brake cable, the brake lever comprising:

a brake handle including an elongate finger grip bar and a transverse elongate mounting arm joined at its proximal end to a proximal end of the grip bar;

means for pivoting the brake handle about a fixed axis;

an elongate slot in the mounting arm aligned lengthwise along a portion of the length of the mounting arm between the fixed axis and the proximal end of the mounting arm;

a cable link having means for attachment to said brake cable and means for engagement within the slot for lengthwise movement within the slot toward and away from the fixed axis; and a bolt aligned lengthwise within the slot and secured to the mounting arm for rotation about a lengthwise axis of the bolt, the bolt engaging the second end of the cable link to arrest movement of the cable link toward the fixed axis at a select distance from the fixed axis, the select distance being variable by axial rotation of the bolt relative to the mounting arm.

2. A brake lever adjustable to vary leverage applied to a brake connected to the lever by a brake cable, the brake lever comprising:

a brake handle including an elongate finger grip bar and a transverse elongate mounting arm joined at its proximal end to a proximal end of the grip bar;

means for pivoting the brake handle about a fixed axis;

an elongate slot in the mounting arm aligned lengthwise along a portion of the length of the mounting arm between the fixed axis and the proximal end of the mounting arm;

a cable link having means for attachment to said brake cable and means for engagement within the slot for lengthwise movement within the slot toward and away from the fixed axis;

a bolt aligned lengthwise within the slot and secured to the mounting arm for rotation about a lengthwise axis of the bolt; and means cooperatively associated with the bolt and the second end of the cable link for arresting movement of the cable link toward the fixed axis at a select distance from the fixed axis, the select distance being variable by axial rotation of the bolt relative to the mounting arm.

* * * * *